(No Model.)
H. E. CUNNINGHAM.
JOURNAL OF SHAFTS.
No. 268,194. Patented Nov. 28, 1882.
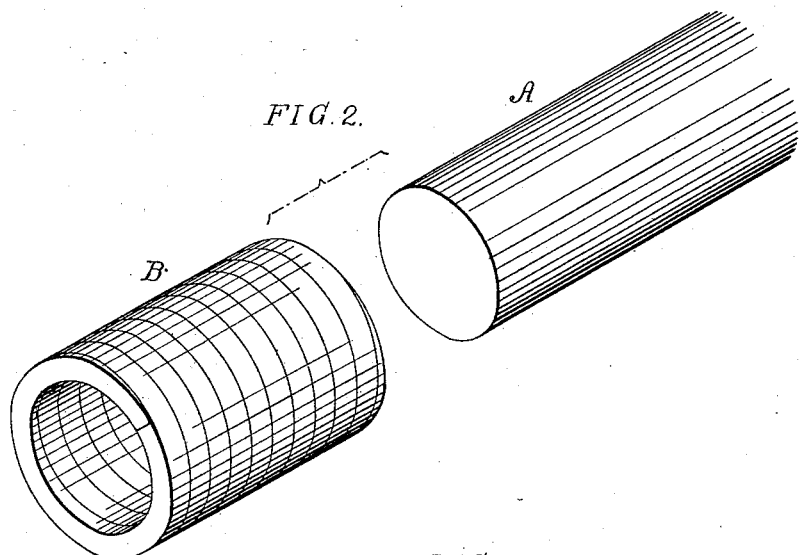
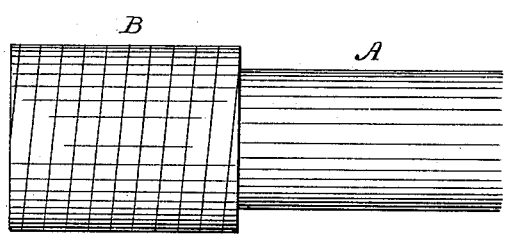
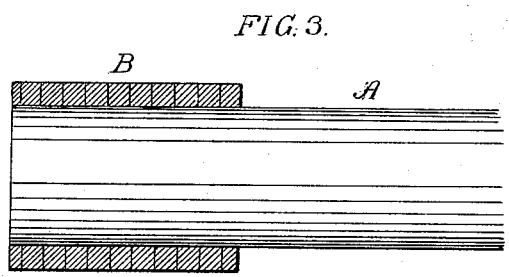
WITNESSES:
James F. Tobin
Harry Smith
INVENTOR:
Heermon E. Cunningham
by his Attorneys
Howson & Son

UNITED STATES PATENT OFFICE.

HERMON E. CUNNINGHAM, OF PHILADELPHIA, PENNSYLVANIA.

JOURNAL OF SHAFTS.

SPECIFICATION forming part of Letters Patent No. 268,194, dated November 28, 1882.

Application filed October 28, 1882. (No model.)

*To all whom it may concern:*

Be it known that I, HERMON E. CUNNINGHAM, a citizen of the United States, and a resident of Philadelphia, Pennsylvania, have invented an Improvement in Journals of Shafts, of which the following is a specification.

My invention relates to the journals of shafts or spindles, especially such as are driven at high speeds; and my invention consists of a journal made in the form of a hollow cylinder by coiling a bar, preferably of steel, the cylinder being slightly elastic, so that when driven onto a shaft it will cling to the same, the object of my invention being to provide shafts with durable journals, which can be readily removed and replaced, and to avoid the expense and delays incurred in discarding shafts with worn-out journals and replacing them by new shafts.

In the accompanying drawings, Figure 1 is a side view of part of a shaft with my improved journal; Fig. 2, perspective views of the shaft and journal detached from each other, and Fig. 3 a view of part of the shaft with the journal in section.

A represents part of a shaft or spindle, and B the journal adapted to the shaft and to any suitable bearing. This journal consists of a bar of iron or steel coiled so as to form a hollow cylinder of the desired length of the journal. The bore of this cylinder should always be slightly less in diameter than the shaft to which it has to be fitted, so that an effort resulting in a slight expansion of the cylinder will be required to drive it onto the shaft, to which it will cling so tenaciously, owing to its inherent recoiling power, that it will retain its position on the shaft without the aid of the appliances usually employed to secure collars, sleeves, &c., to shafts. I prefer to harden or temper the cylinder prior to its application to the shaft, a spring-temper being desirable, partly because it imparts elasticity to the cylinder and partly because steel with a spring-temper affords a most durable journal. There are qualities of steel, however, of which a coiled cylinder of sufficient elasticity can be made without tempering, which at the same time will afford a very durable journal. The cylinder may be bored internally for application to the shaft; but if the bar is properly coiled it will be sufficiently true to cling to the shaft without preliminary boring. If a hardened or tempered journal is required, the cylinder may be first fitted to the shaft, turned while on the same, and then removed and tempered or hardened; or a hardened cylinder may be fitted to the shaft and then trued by grinding.

The journals of shafts and spindles which are driven at high speeds soon become so worn that the entire shaft must be discarded, an evil which is obviated by my invention, as the worn journal can be removed and replaced by a new one without material delay or expense. The invention, moreover, affords the opportunity of applying to a shaft a journal of much more durable character than a journal formed on a shaft of the wrought-iron usually employed in shafts.

I claim as my invention—

1. As a new manufacture, a journal consisting of a bar coiled to form a hollow slightly-elastic cylinder adapted to fit on and cling to a shaft or spindle, substantially as set forth.

2. The combination of a shaft or spindle with an elastic tubular journal adapted to the said shaft or spindle, substantially as set forth.

3. A hardened or tempered elastic journal, consisting of a bar coiled to the form of a hollow cylinder, and adapted to be driven on and to cling to a shaft or spindle, substantially as set forth.

In testimony whereof I have signed my name to this specification in the presence of two subscribing witnesses.

HERMON E. CUNNINGHAM.

Witnesses:
 HARRY DRURY,
 HARRY SMITH.